(12) United States Patent
Krishnamurthy

(10) Patent No.: US 11,481,367 B2
(45) Date of Patent: Oct. 25, 2022

(54) REDO MINING DURING ROLLING UPGRADE

(71) Applicant: Oracle International Corporation, Redwood Shores, CA (US)

(72) Inventor: Saikrishnan Krishnamurthy, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/010,687

(22) Filed: Sep. 2, 2020

(65) Prior Publication Data

US 2022/0067005 A1    Mar. 3, 2022

(51) Int. Cl.
| | | |
|---|---|---|
| *G06F 16/00* | (2019.01) | |
| *G06F 16/21* | (2019.01) | |
| *G06F 16/23* | (2019.01) | |
| *G06F 16/27* | (2019.01) | |
| *G06F 11/14* | (2006.01) | |

(52) U.S. Cl.
CPC .......... *G06F 16/214* (2019.01); *G06F 16/213* (2019.01); *G06F 16/2358* (2019.01); *G06F 16/2365* (2019.01); *G06F 16/27* (2019.01); *G06F 11/1471* (2013.01)

(58) Field of Classification Search
CPC ...... G06F 16/214; G06F 16/27; G06F 16/213; G06F 16/2358; G06F 16/2365; G06F 11/1471

USPC .................................................. 707/600-899
See application file for complete search history.

(56) References Cited

U.S. PATENT DOCUMENTS

| | | | |
|---|---|---|---|
| 2003/0212789 A1* | 11/2003 | Hamel .................. | G06F 16/273 709/225 |
| 2004/0225696 A1* | 11/2004 | Wong .................... | G06F 16/273 |
| 2005/0256861 A1* | 11/2005 | Wong ...................... | G06F 16/27 |
| 2008/0162590 A1* | 7/2008 | Kundu ................ | G06F 11/1471 |
| 2011/0010392 A1* | 1/2011 | Wong .................. | G06F 16/2358 707/E17.014 |
| 2012/0278282 A1* | 11/2012 | Lu ......................... | G06F 16/273 707/634 |
| 2018/0081922 A1* | 3/2018 | Brown .............. | G06F 16/24568 |
| 2018/0239677 A1* | 8/2018 | Chen ..................... | G06F 11/203 |

* cited by examiner

*Primary Examiner* — Michelle N Owyang
(74) *Attorney, Agent, or Firm* — Hickman Becker Bingham Ledesma LLP

(57) ABSTRACT

In some embodiments, a client replication service manages log mining during a rolling upgrade, in which the primary role is switched over from an original primary DBMS to a new primary DBMS having updated software. The client replication service or specifically a mining engine maintains an original session on the original primary DBMS to mine redo logs associated with the original primary DBMS until the original primary DBMS is not a primary DBMS anymore. At that time, if the mining of those redo logs is not complete, the client replication service further starts a downstream session on the new primary DBMS to mine copies of the unmined redo logs.

18 Claims, 4 Drawing Sheets

302 Start mining redo logs associated with an original primary database in an original replication session on the original primary database 304 Receive a first notification that the original primary database is no longer a primary database 306 Terminate, in response to the first notification, the original replication session 308 Receive a second notification that a logical standby of the original primary database is converted to a new primary database 310 Start, in response to the second notification, mining foreign redo logs registered with the new primary database in a downstream replication session on the new primary database, the foreign redo logs being copies of the redo logs associated with the original primary database

REDO MINING DURING ROLLING UPGRADE

FIELD OF THE INVENTION

The techniques and approaches described herein, relate to the field of electronic database management, particularly to maintaining log mining and replication during a database upgrade.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A primary database of a primary database management system (DBMS) can be replicated to a standby database of a standby DBMS using standby replication. As the term is used herein, standby replication is a service that can replicate at both a physical level (physical replication) and a logical level (logical replication). The primary purpose of standby replication is to replicate changes made to a primary database of a primary DBMS to a physical standby database of a standby DBMS through physical replication or a logical standby database through logical replication.

Physical replication replicates at a data block level. Data blocks may be data blocks in a file used by a DBMS to store database data, such as tables. Data blocks at a primary DBMS are replicated as copies of the data blocks in a standby database. When a row in a data block is changed, the change to the data block is replicated or applied in a copy of the data block at the standby database. In some cases, because standby replication replicates at the physical level, standby replication is used for homogenous DBMSs configured to recognize and use the same database formatting in the data blocks being replicated.

With logical replication, rows in a primary DBMS are replicated in copies of the rows in the standby database. A copy of a row that is in a data block in a primary DBMS does not have to be and is not likely stored in a replica of the data block at the standby database. In general, a row is uniquely identified by a primary key, which may be one or more attributes of the row that uniquely identify the row within a table of the primary DBMS.

A client replication service, such as one from Oracle GoldenGate, replicates database data using only logical replication. In some cases, the client database replication service may be configured to replicate a subset of the database objects in a primary database to a destination database. The destination database is referred to herein as the client database. The primary DBMS hosting the primary database and the "client DBMS" hosting the client database may be heterogeneous, e.g. running different database software products from different vendors.

The client replication service includes several components. One component of the client replication service is an extract process running on the primary DBMS. The extract process consumes logical change records produced by a mining engine on the primary DBMS and may persist the changes in a series of "trail files" called a trail. The mining engine mines redo logs of the primary DBMS for changes to replicate and generates logical change records for those changes. The logical change records are sent to the extract process, which may transform the logical change records and then store logical change records in a trail.

Another component of the client database replication service is a replicate service running on the client DBMS. The replicate service that reads data in a trail and then produces and applies the logical change records to the client database.

The mining engine may maintain a session on the primary DBMS for mining redo logs of the primary DBMS. The session stores session information in system tables in the primary DBMS. The information includes an indication of what redo logs are needed and progress metadata describing the extent to which redo logs have been mined. This information is needed to restart the session from a point it left off. The mining engine also maintains a dictionary in the system tables to keep track of objects encountered in processing the redo stream with respect to database tables in the primary DBMS.

When the primary DBMS is backed by a physical standby, the session information and dictionary are also physically replicated to the physical standby because the system tables that contain the session information and dictionary are replicated as part of the database. Thus, if the mining engine operation were halted on the primary DBMS and restarted on a standby DBMS, the mining engine can determine where to resume operation because the information regarding the progress of mining engine operation in the primary DBMS is stored in session information and dictionary in the replicated system tables.

Rolling Upgrade

A primary DBMS and standby DBMS may be upgraded occasionally. It is desirable that interruption to services provided by a primary DBMS and/or standby DBMS be minimized during an upgrade. One approach to upgrading that minimizes interruption of service is a rolling upgrade. A software upgrade service may perform a rolling upgrade. In a rolling upgrade, a standby DBMS is upgraded first. After the standby DBMS is upgraded, it becomes the primary DBMS and the original primary DBMS is upgraded and can become a standby DBMS.

The standby DBMS converts from physical replication to logical replication. The period during which the standby DBMS is using logical replication during the rolling upgrade is referred to as the "logical replication phase" of the rolling upgrade.

As already mentioned, after the upgrade of the standby DBMS is complete, the standby DBMS becomes the new primary DBMS and the original primary DBMS can become the new standby DBMS. The original standby DBMS switching to the role of primary DBMS is referred herein as a switchover.

During the logical replication phase, the physical standby DBMS before being converted to a logical standby DBMS and the standby DBMS diverge physically, e.g. the DBMSs contain identical rows but not in identical data blocks. In order to become the new physical standby DBMS, the original primary DBMS is brought to a state right before logical replication phase began at which the original primary DBMS and new primary DBMS were the same at the physical level. The state is referred to herein as the recovery state. Redo records generated at the new primary DBMS for changes made during the logical replication phase are then applied to the original primary DBMS. As a result of applying the changes, database changes made as part of the upgrade to the original standby DBMS are made to the original primary DBMS. The recovery state may be efficiently generated by creating a snapshot of the original primary DBMS right before logical replication phase and flashing the original primary DBMS back to the snapshot before applying the redo records from the new primary DBMS.

Starting Client Replication Service on New Primary DBMS

After switchover, the client replication service at the new primary DBMS takes over for the client replication service on the original primary DBMS. During logical replication phase, the system tables are not replicated and hence the latest session information and dictionary is not available on the logical standby DBMS. When the mining engine takes over on the new primary DBMS on switch over, information about the progress of the mining engine on the original primary DBMS after the beginning of the logical replication is not available on the new primary DBMS because logical replication does not copy data in the system tables in the original primary DBMS. If the mining engine on the original primary DBMS had continued to run but had not completed processing redo logs for all the changes made by the original primary DBMS when switchover occurred, information about what redo logs the mining engine may had processed or partially processed would not be available in the system tables of the new primary DBMS. Hence, the mining engine does not know where to continue processing redo logs from the original primary DBMS to minimize interruption to clients of the client replication service. Instead, the mining engine would pick up from where the log mining was before the rolling upgrade started, resulting in duplicate changes or otherwise inconsistent records on the new primary DBMS. For this reason, the mining engine operation is ceased once the logical replication phase begins. In either case, the service provided by client replication service is interrupted.

In addition, a logical standby DBMS does not support certain mining features of the client replication service, such as ignoring individual records or transactions that are associated with specified tags or users, because certain data in redo logs, such as the tags or logged-in application user information, are not replicated in logical replication. Therefore, if the mining engine resumed operation on the new primary DBMS to mine the redo logs replicated into the logical standby DBMS after the rolling upgrade began, those mining features would be ignored.

BRIEF DESCRIPTION OF THE DRAWINGS

In the drawings of certain embodiments in which like reference numerals refer to corresponding parts throughout the figures.

DETAILED DESCRIPTION

Figure 1:
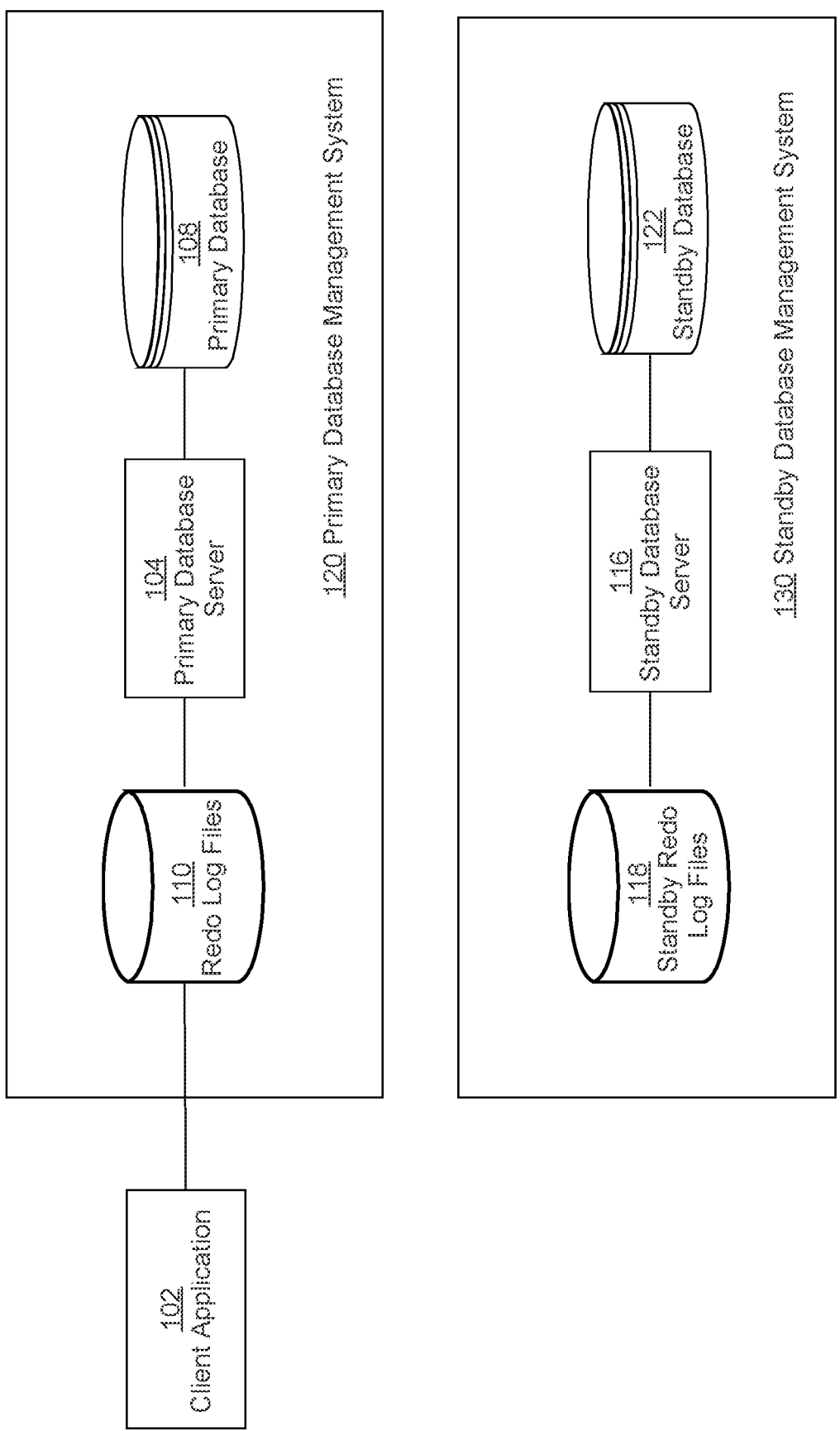
FIG. 1 is a system diagram that illustrates a DBMS replicating database changes in a primary DBMS to a standby database, according to an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

A client replication service manages log mining via a mining engine at the conclusion of a rolling upgrade, during which the role of primary DBMS is switched over from an original primary DBMS to the original standby DBMS. The mining engine maintains an original session on the original primary DBMS to mine redo logs associated with the original primary DBMS until the original primary DBMS is not a primary DBMS anymore. At that time, if the mining of those redo logs is not complete, the client replication service further starts a "downstream" mode via the mining engine on the new primary DBMS to mine copies of the unmined redo logs associated with the original primary DBMS.

In the original session, the mining engine updates original session information and an original dictionary in the original primary DBMS. The original session information identifies the redo logs associated with the original primary database, indicates which of those redo logs have been mined and which of those redo logs still need to be mined, and the original dictionary track objects encountered in the redo logs.

During the original session, a physical standby DBMS of the original primary DBMS is converted to a logical standby DBMS in a rolling upgrade. In some embodiments, the client replication service is set up in a downstream mode with respect to the logical standby DBMS. In the downstream mode, the redo logs are transported from the original primary DBMS to the logical standby DBMS. The transported redo logs are herein referred to as foreign redo logs with respect to the downstream client replication service. More specifically, the foreign redo logs are received and registered but are not mined. At the same time, the mining engine on the original primary DBMS continues to mine the redo logs associated with the original primary DBMS that were sent as foreign redo logs to the logical standby DBMS. Any resulting changes to the original primary DBMS are written into redo logs and replicated to the logical standby DBMS.

Downstream mode is useful in contexts other than rolling upgrades. In general, downstream mode may be used to offload much of the overhead of running a client replication service on any source DBMS from which changes are being replicated to a separate downstream DBMS.

On switchover, the client replication service on the original primary DBMS ceases to process redo logs. A log mining session runs on the new primary DBMS hosting a downstream client replication service and stores session information in the system tables of the host DBMS. The downstream session information includes registration data or otherwise recording foreign redo logs received and progress metadata that tracks progress of mining redo logs, including progress information regarding the mining of redo logs on the original primary DBMS made available with the switchover. The mining engine then begins processing foreign redo logs based on the downstream session information and an appropriate dictionary. Because the foreign redo logs are registered and are in effect staged on the original standby DBMS which is now the new primary DBMS, the mining engine begins mining the foreign redo logs on the new primary DBMS.

Once the foreign redo logs are processed to completion, the downstream client replication service exits downstream mode. The client replication service begins processing local redo logs for redo records generated on or after switchover at the new primary DBMS.

By virtue of the approach described above, the original replication session is allowed to continue after the physical standby DBMS is converted to the logical standby DBMS, avoiding delay in log mining and providing maximum support of mining features not supported by the logical standby. Even if updates to the original session information and the original dictionary in the original primary database made between the conversion to the logical standby and the switchover to the new primary database are not directly replicated into the logical standby, such information becomes available to the logical standby and subsequently the new primary DBMS via at least the transmission and processing of the foreign redo logs. Therefore, after the switchover, the client replication service can effectively complete mining of the redo logs associated with the original primary DBMS in the downstream session.

Illustrative DBMS

FIG. 1 is a system diagram that illustrates DBMS 100 in which changes made to data contained in a primary database are applied, in real-time, to a standby database, according to an embodiment. Primary DBMS 120 comprises a database server 104, a primary database 108, and redo log files 110. The standby DBMS 130, which could be for a physical standby database or a logical standby database, comprises a standby database server 116, standby redo log files 118, and a standby database 122. Standby database 122 may be located at a location that is remote relative to primary database 108 but connected through a network, such as a local area network (LAN), or a wide-area network (WAN) such as the Internet.

Client application 102, which could be a client replication service or a software upgrade service, for example, sends database commands to database server 104. Database server 104 receives the database commands from client application 102 and obtains the data from primary database 108.

Database server 104 applies changes indicated by the database commands to the obtained data. A "log writer" process of database server 104 also writes, to redo log files 110, redo records that indicate the changes to data blocks that database server 104 applied to the obtained data. At some point in time, a "database writer" process of database server 104 may store the modified to primary database 108.

According to an embodiment, log entries written to redo log files 110 are also transmitted, to standby database server 116. When database server 104 writes a redo record to redo log files 110, database server 104 may also transmit the redo record through network (not shown in FIG. 1) to standby database server 116. Standby database server 116 receives the redo records from database server 104 and applies the redo records to standby database 122. Standby database server 116 may apply the redo records soon after receiving the redo records. As a result, the data contained in standby database 122 is quickly synchronized with the data contained in primary database 108. At any given moment, the content of the data in standby database 122 may reflect the content of the data in primary database 108.

Maintaining Log Mining of Original Primary DBMS

Figure 2:
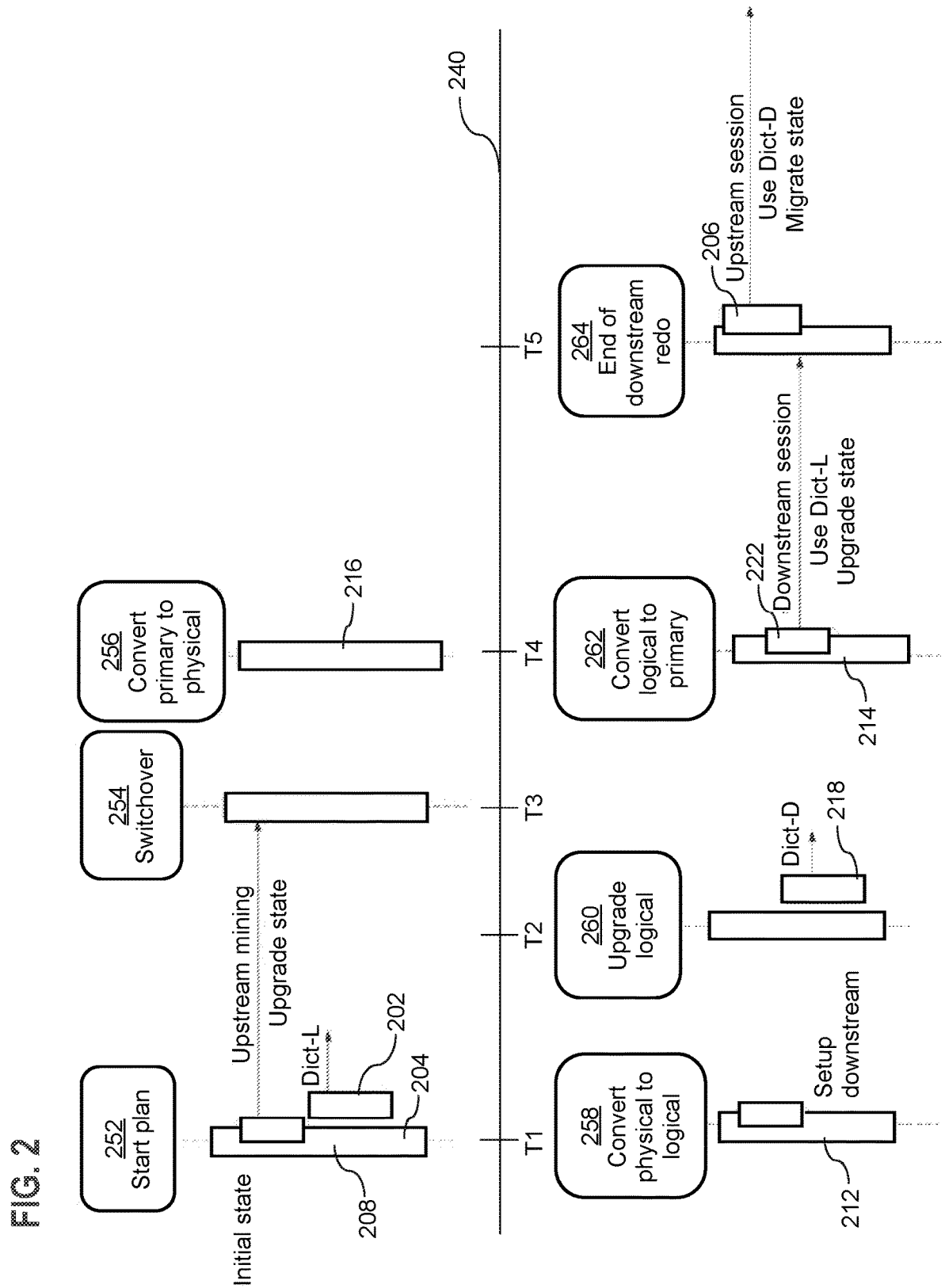
FIG. 2 illustrate the relationships among different databases during a rolling upgrade in an embodiment

FIG. 2 illustrates the relationships among different DBMSs during a rolling upgrade, in an embodiment. The line 240 represents the timeline for the rolling upgrade and beyond and indicates key points T1 through T5, as further discussed below.

The original primary DBMS 208 has an original physical standby DBMS. Before time T1, a client replication service maintains an original session (in conjunction with a mining engine) on the original primary DBMS 208, storing original session information and an original dictionary 202 in the original primary DBMS 208. At a recovery point before time T1, the original physical standby DBMS is identical to the original primary DBMS 208. Time T1 marks the start of the rolling upgrade. At time T1, a software upgrade service, which may include one or more database servers for the databases, starts the rolling upgrade in 252 and converts the original physical standby DBMS to an logical standby DBMS 212 in 258. The original logical standby DBMS 212 includes copies of the original session information and the original dictionary 202 as of the recovery point.

At time T1 or within a certain time range, the client replication service can set up a downstream mode on the logical standby DBMS 212. A new primary DBMS 214 that will be converted from the logical standby DBMS 212, as discussed below, is to serve as the downstream DBMS for the original primary DBMS 208. In setting up the downstream mode, the software upgrade service or the client replication service updates copies of original session information or the original dictionary 202 on the new primary DBMS 214 to indicate that the mining engine will be running on the new primary DBMS in the downstream mode after the switch over, as further discussed below. The client replication service or another service also transports copies of original redo logs 204 associated with or stored within the original primary DBMS 208 to the logical standby DBMS 212, which can be limited to those redo logs created from the original primary DBMS 208 after the conversion to the logical standby DBMS occurs. These copies become foreign redo logs 222 in the logical standby DBMS 212 and subsequently the new primary DBMS 214. The client replication service or another service also records the information related to those foreign redo logs 222 in the logical standby DBMS 212, specifically within copies of original session information, for use by a downstream session after the logical standby DBMS 212 is converted to the new primary DBMS 214. While the original primary DBMS retains the primary role, the mining engine continues mining the original redo logs 204 and updating the original session information and the original dictionary 202 in an upstream (regular) mode through the conversion from the physical standby DBMS to the logical standby DBMS. The upstream mode continues until time T3, as discussed below.

At time T2 after time T1, the software upgrade service upgrades the logical standby DBMS 212 with new database software, scripts, and so on in 260. At time T2 or within a certain time range, the mining engine can also establish a new dictionary 218 to be used by a new session for mining new redo logs 206 generated from and associated with the new primary DBMS 214, or wait to do so until time T3, T4, or T5, as discussed below.

At time T3 after time T2, the software upgrade service performs a primary DBMS switchover in 254 so that the original primary DBMS 208 is no longer a primary DBMS. At time T3 or within a certain time range, the client replication service then stops the upstream mode thus terminating the original session on the original primary DBMS 208.

At time T4, which can coincide with time T3 or is within a certain time range after time T3, the software upgrade service converts the logical standby DBMS 212 to the new primary DBMS 214 in 262. At time T4 or within a certain time range, the software upgrade service further stores progress information regarding the original session on the original primary DBMS 208, including which of the original redo logs 204 should be mined next, into the copies of the original session information or the original dictionary 202, or another location accessible to the client replication service, on the new primary DBMS 214.

At time T4 or within a certain time range, the client replication service enters the downstream mode and activates a downstream session on the new primary DBMS 214 using downstream session information and a downstream dictionary, which can include or be based on the updated copies of the original session information and the original dictionary 202. In the downstream mode, the mining engine mines the foreign redo logs 222 now registered or stored within the new primary DBMS 214. The downstream session information and the downstream dictionary now include object data collected from the foreign redo logs 222 that correspond to the original redo logs 204, including all those original redo logs 204 mined in the original session, and information regarding which of the foreign redo logs 222 to mine next. Therefore, the downstream session information and the downstream dictionary are ready for use in the downstream mode. At time T4 or within a certain time range, the software upgrade service can convert the original primary DBMS 208 to a new physical standby DBMS 216 of the new primary DBMS 214, or wait until a later time in 256. Typically, T4 or this later time marks the end of the rolling upgrade.

At time T5, the mining of the foreign redo logs 222 is complete, thus terminating the downstream mode in 264. The client replication service then initiates the upstream mode and activates the new session on the new primary DBMS 214. In the upstream mode, the mining engine mines the new redo logs 206 associated with or stored within the new primary DBMS 214 and updates new session information and the new dictionary 218 on the new primary DBMS 214, as was done for the original primary DBMS 208. The new session information and the new dictionary 218 can include or be based on the copies of the original session information and the original dictionary 202, where the original session information was continuously updated through the downstream mode.

In this manner, the log mining continues between time T1 and time T3, and again from T4 to T5 seamlessly, leading to little delay for the client replication service or the mining engine. While there is no complete synchronization between the original primary DBMS 208 and the logical standby DBMS 212 between time T1 and time T3, the copies of the original session information in the logical standby 212 continue to be updated to be close to the original session information in the original primary DBMS 208. In addition, as the original redo logs 204 were mined within the original session between time T1 and time T3, and the foreign redo logs 222 were mined in the downstream session between time T4 and time T5, the mining performed on redo logs produced in logical replication where certain mining features would not be supported would be minimized.

Figure 3:
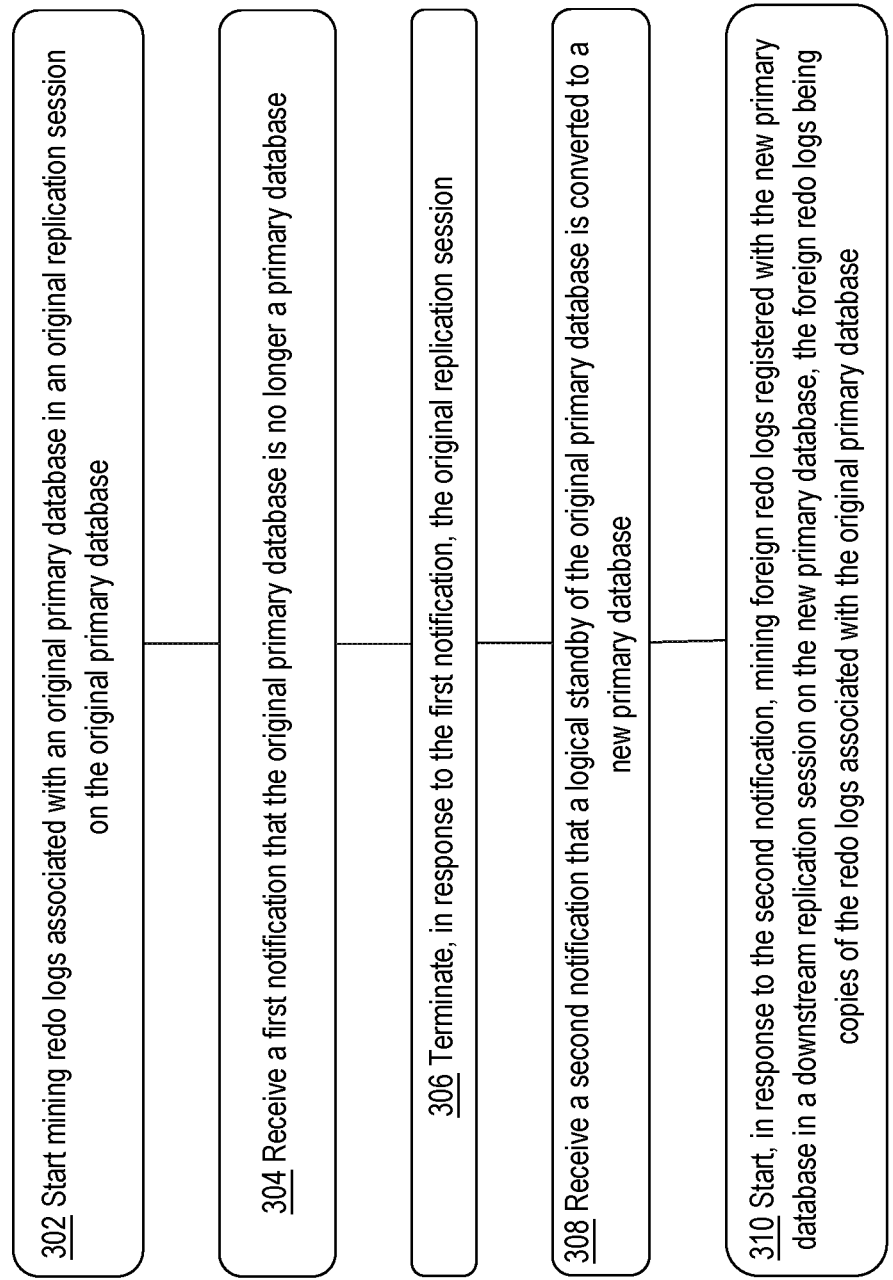
FIG. 3 illustrates a computer-implemented process of log mining during a rolling upgrade in an embodiment.

FIG. 3 illustrates a computer-implemented process of log mining during a rolling upgrade in an embodiment.

At block 302, the mining engine starts mining redo logs associated with an original primary DBMS in an original session on the original primary DBMS.

In an embodiment, the mining engine can access original session information and an original dictionary in the original primary DBMS in an original session on the original primary DBMS. The original session information would identify the redo logs associated with the original primary DBMS or how far mining has been done to the redo logs associated with the original primary DBMS. The original dictionary would keep track of objects encountered in mining the redo logs associated with the original primary DBMS.

In an embodiment, the client replication service generates trail files related to data captured from mining the redo logs associated with the original primary DBMS and transmit the trail files to a remote client device.

In an embodiment, the client replication service can receive a certain notification that a physical standby of the original primary DBMS is converted to the logical standby DBMS in a rolling upgrade involving the original primary DBMS. The logical standby DBMS does not support one or more features related to mining redo logs that are nonetheless supported by the original primary DBMS. The client replication service or another service can, in response to the certain notification, transport copies of one or more of the redo logs associated with the original primary DBMS to the logical standby DBMS. The client replication service or another service can further record information regarding the copies as foreign redo logs in the logical standby as the foreign redo logs are accepted.

In an embodiment, the client replication service or the mining engine can be configured to then receive a specific notification that the logical standby is upgraded with updated software. The mining engine can, in response to the specific notification, create a new dictionary for a new session on a new primary DBMS to be converted from the logical standby to keep track of objects encountered in mining redo logs associated with the new primary DBMS.

At block 304, the client replication service receives a first notification that the original primary DBMS is no longer a primary DBMS. At block 306, the client replication service terminates, in response to the first notification, the original session. Such termination leads to a downstream session on the new primary DBMS based on the original session, as further discussed below.

At block 308, the client replication service receives a second notification that a logical standby DBMS of the original primary DBMS is converted to a new primary DBMS. In response to the second notification, the client replication service or another service records an update of progress of the original session, including which redo logs associated with the original primary DBMS were to be mined next, in the new primary DBMS. The old primary DBMS can be converted to a physical standby DBMS of the new primary DBMS at some point.

At block 310, the mining engine starts, in further response to the second notification, mining the foreign redo logs registered with the new primary DBMS in a downstream session on the new primary DBMS, where the foreign redo logs are copies of the redo logs associated with the original primary DBMS.

In an embodiment, the mining engine can access downstream session information and a downstream dictionary in the new primary DBMS in a downstream session on the new primary DBMS. The downstream session information would identify the foreign redo logs or how far mining has been done to the foreign redo logs based on the information regarding the foreign redo logs. The downstream dictionary would keep track of objects encountered in mining the foreign redo logs based on the information regarding the foreign redo logs.

In an embodiment, the client replication service, when mining the foreign redo logs is complete, terminates the downstream session and starts mining redo logs associated with the new primary DBMS in a new session on the new primary DBMS. The mining engine can further access new session information and a new dictionary in the new primary DBMS in a new session on the new primary DBMS. The new session information would identify the redo logs generated from and associated with the new primary DBMS or how far mining has been done to the redo logs generated from and associated with the new primary DBMS. The new dictionary would keep track of objects encountered in mining the redo logs generated from and associated with the new primary DBMS.

Database Management Systems

A DBMS, such as DBMS 100 described herein, manages a database. A DBMS may comprise one or more database servers such as primary DBMS server 104 and standby database server 116 that are described in FIG. 1. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the approach are described herein using the term "SQL", the approach is not limited to just this particular database query language, and may be used in conjunction with other database query languages and constructs.

A client may issue a series of requests, such as requests for execution of queries, to a database server by establishing a database session, referred herein as "session". A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node DBMS may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node DBMS hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node DBMS can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Memory and Database Data Block Overview

According to an embodiment, memory may be byte-addressable or block-addressable. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

A data block is used by a DBMS to store one or row more database rows, or portions of rows, including one or more columns of a row. When rows are read from persistent storage, a data block containing the row is copied into a database data block buffer in RAM and/or main memory of a database server. A data block that is used to store database data maybe referred to herein as a database block. A database block usually contains multiple rows, and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
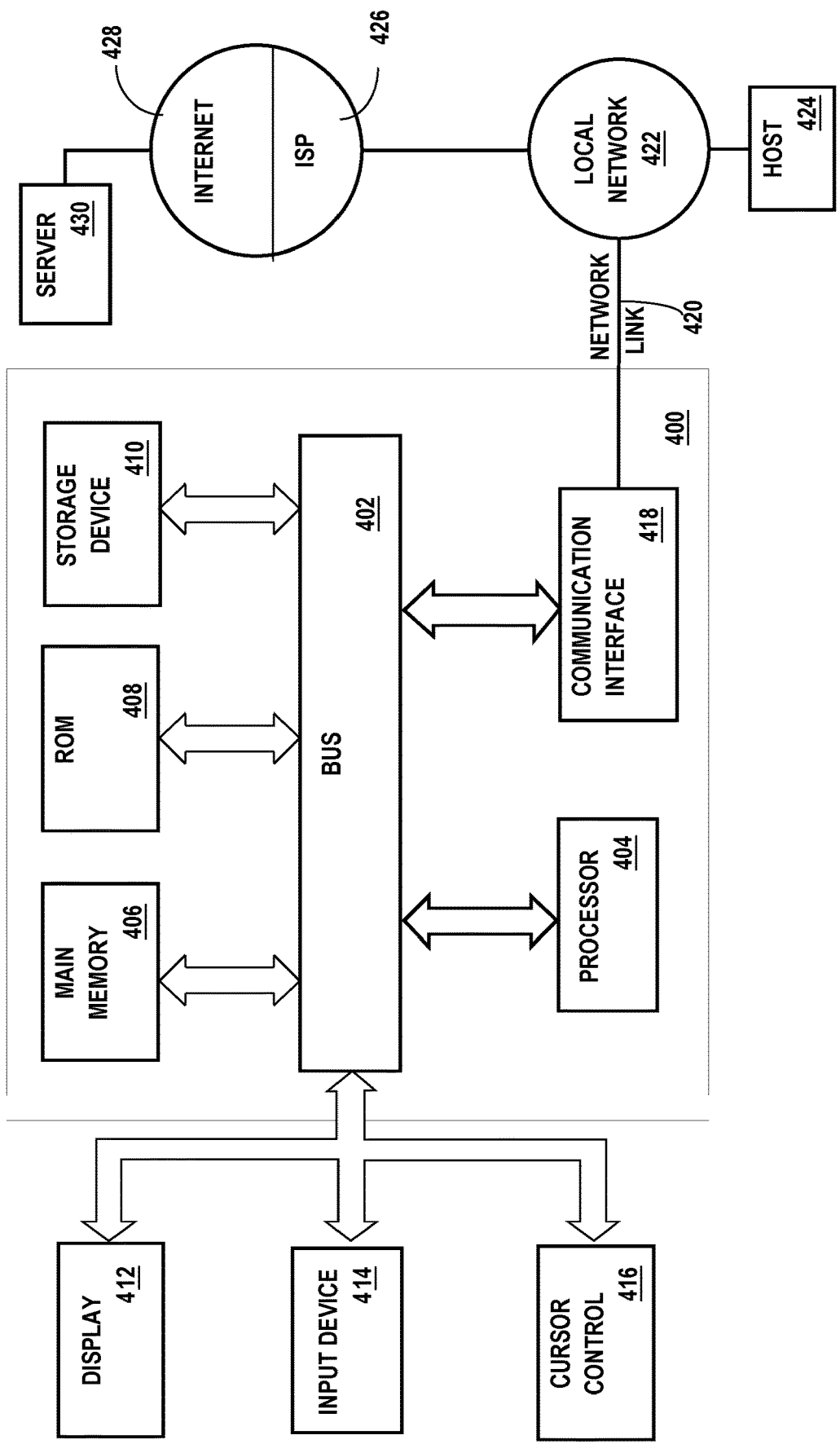
FIG. 4 is a block diagram that illustrates a computer system upon which an embodiment of the approach may be implemented.

For example, FIG. 4 is a block diagram that illustrates a computer system 400 upon which an embodiment of the approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A method of mining redo logs during a rolling upgrade, comprising:

starting mining redo logs associated with an original primary database management system (DBMS) in an original session on the original primary DBMS, the redo logs associated with the original primary DBMS recording changes to data blocks of the original primary DBMS;

receiving a first notification that the original primary DBMS is no longer a primary DBMS;

terminating, in response to the first notification, the original session;

receiving a second notification that a logical standby DBMS of the original primary DBMS is converted to a new primary DBMS;

starting, in response to the second notification, mining foreign redo logs registered with the new primary DBMS in a downstream session on the new primary DBMS, the foreign redo logs being copies of the redo logs associated with the original primary DBMS;

when mining the foreign redo logs is complete, terminating the downstream session and starting mining redo logs associated the new primary DBMS in a new session on the new primary DBMS, the redo logs associated with the new primary DBMS recording changes to data blocks of the new primary DBMS.

2. The method of claim 1, starting mining redo logs associated the original primary DBMS comprising:
   accessing original session information and an original dictionary in the original primary DBMS, in the original session on the original primary DBMS,
   the original session information identifying the redo logs associated the original primary DBMS or how far mining has been done to the redo logs associated the original primary DBMS,
   the original dictionary keeping track of objects encountered in mining the redo logs associated with the original primary DBMS.

3. The method of claim 1, in response to the second notification and before starting mining the foreign redo logs, recording an update of progress of the original session, including which redo logs associated with the original primary DBMS were to be mined next, in the new primary DBMS.

4. The method of claim 1, further comprising:
   receiving a third notification that a physical standby DBMS of the original primary DBMS is converted to the logical standby DBMS in a rolling upgrade involving the original primary DBMS;
   in response to the third notification, copies of one or more of the redo logs associated with the original primary DBMS being transported to the logical standby DBMS and information regarding the copies as the foreign redo logs in the logical standby DBMS being recorded as the foreign redo logs are accepted.

5. The method of claim 4, starting mining the foreign redo logs comprising:
   accessing downstream session information and a downstream dictionary in the new primary DBMS, in the downstream session on the new primary DBMS,
   the downstream session information identifying the foreign redo logs or how far mining has been done to the foreign redo logs based on the information regarding the foreign redo logs,
   the downstream dictionary keeping track of objects encountered in mining the foreign redo logs based on the information regarding the foreign redo logs.

6. The method of claim 1, further comprising:
   receiving a third notification that the logical standby DBMS is upgraded with updated software;
   in response to the third notification, creating a new dictionary for a new session on the new primary DBMS to keep track of objects encountered in mining redo logs associated with the new primary DBMS.

7. The method of claim 1, the terminating leading to starting the downstream session on the new primary DBMS based on the original session.

8. The method of claim 1, starting mining the redo logs associated with the new primary DBMS comprising:
   accessing new session information and a new dictionary in the new primary DBMS, in a new session on the new primary DBMS,
   the new session information identifying the redo logs generated from and associated with the new primary DBMS or how far mining has been done to the redo logs generated from and associated with the new primary DBMS,
   the new dictionary keeping track of objects encountered in mining the redo logs generated from and associated with the new primary DBMS.

9. The method of claim 1, the original primary DBMS supporting one or more features related to mining redo logs that are not supported by the logical standby DBMS.

10. The method of claim 1, starting mining the redo logs associated with the original primary DBMS comprising:
    generating trail files related to data captured from mining the redo logs associated with the original primary DBMS;
    transmitting the trail files to a remote client device.

11. The method of claim 1, the original primary DBMS being converted to a physical standby DBMS of the new primary DBMS.

12. A non-transitory storage medium storing sequences of instructions which, when executed by one or more computing devices, cause:
    starting mining redo logs associated with an original primary database management system (DBMS) in an original session on the original primary DBMS, the redo logs associated with the original primary DBMS recording changes to data blocks of the original primary DBMS;
    receiving a first notification that the original primary DBMS is no longer a primary DBMS;
    terminating, in response to the first notification, the original session;
    receiving a second notification that a logical standby DBMS of the original primary DBMS is converted to a new primary DBMS;
    starting, in response to the second notification, mining foreign redo logs registered with the new primary DBMS in a downstream session on the new primary DBMS,
    the foreign redo logs being copies of the redo logs associated with the original primary DBMS;
    when mining the foreign redo logs is complete, terminating the downstream session and starting mining redo logs associated the new primary DBMS in a new session on the new primary DBMS, the redo logs associated with the new primary DBMS recording changes to data blocks of the new primary DBMS.

13. The non-transitory storage medium of claim 12, wherein starting mining redo logs associated with the original primary DBMS comprises:
    accessing original session information and an original dictionary in the original primary DBMS, in the original session on the original primary DBMS,
    the original session information identifying the redo logs associated with the original primary DBMS or how far mining has been done to the redo logs associated with the original primary DBMS,
    the original dictionary keeping track of objects encountered in mining the redo logs associated with the original primary DBMS.

14. The non-transitory storage medium of claim 12, wherein the sequences of instructions include instructions that, when executed by said one or computing devices, cause, in response to the second notification and before starting mining the foreign redo logs, recording an update of progress of the original session, including which redo logs associated with the original primary DBMS were to be mined next, in the new primary DBMS.

15. The non-transitory storage medium of claim 12, wherein the sequences of instructions include instructions that, when executed by said one or computing devices, cause:
    receiving a third notification that a physical standby DBMS of the original primary DBMS is converted to the logical standby DBMS in a rolling upgrade involving the original primary DBMS;

in response to the third notification, copies of one or more of the redo logs associated with the original primary DBMS being transported to the logical standby DBMS and information regarding the copies as the foreign redo logs in the logical standby DBMS being recorded as the foreign redo logs are accepted.

16. The non-transitory storage medium of claim 15, wherein starting mining the foreign redo logs comprises:

accessing downstream session information and a downstream dictionary in the new primary DBMS, in a downstream session on the new primary DBMS, the downstream session information identifying the foreign redo logs or how far mining has been done to the foreign redo logs based on the information regarding the foreign redo logs, the downstream dictionary keeping track of objects encountered in mining the foreign redo logs based on the information regarding the foreign redo logs.

17. The non-transitory storage medium of claim 12, wherein starting mining the redo logs associated with the new primary DBMS comprises:

accessing new session information and a new dictionary in the new primary DBMS, in a new session on the new primary DBMS, the new session information identifying the redo logs generated from and associated with the new primary DBMS or how far mining has been done to the redo logs generated from and associated with the new primary DBMS, the new dictionary keeping track of objects encountered in mining the redo logs generated from and associated with the new primary DBMS.

18. A system for mining redo logs during a rolling upgrade, comprising:

a memory;

a processor cooperating with the memory to perform:

in response to a physical standby database management system (DBMS) of an original primary DBMS being converted to a logical standby DBMS in a rolling upgrade, updating new session information for a mining engine on the logical standby DBMS to indicate a downstream mode, while the mining engine continues mining redo logs recording changes to data blocks of the original primary DBMS in an original session on the original primary DBMS;

causing, in the downstream mode, transporting of copies of redo logs recording changes to the data blocks of the original primary DBMS to the logical standby DBMS and registering the copies of redo logs as foreign redo logs on the logical standby DBMS, in response to the logical standby DBMS being converted to a new primary DBMS in the rolling upgrade, the mining engine starting mining at least one of the foreign redo logs that has not been mined in the original session based on the new session information in a downstream session on the new primary DBMS, instead of the original session on the original primary DBMS.

* * * * *

UNITED STATES PATENT AND TRADEMARK OFFICE
CERTIFICATE OF CORRECTION

PATENT NO. : 11,481,367 B2
APPLICATION NO. : 17/010687
DATED : October 25, 2022
INVENTOR(S) : Saikrishnan Krishnamurthy It is certified that error appears in the above-identified patent and that said Letters Patent is hereby corrected as shown below:

In the Specification

In Column 3, Line 57, after "embodiment" insert -- . --, therefor.

In Column 10, Line 53, after "or" insert -- more --, therefor.

In the Claims

In Column 15, Line 4, in Claim 2, after "associated" insert -- with --, therefor.

In Column 15, Line 9, in Claim 2, after "associated" insert -- with --, therefor.

In Column 15, Line 10, in Claim 2, after "associated" insert -- with --, therefor.

In Column 16, Line 56, in Claim 14, after "or" insert -- more --, therefor.

In Column 16, Line 64, in Claim 15, after "or" insert -- more --, therefor.

Signed and Sealed this
Twentieth Day of June, 2023

Katherine Kelly Vidal
*Director of the United States Patent and Trademark Office*